Dec. 6, 1966  F. M. WOOD ETAL  3,290,167
MOTION RESPONSIVE FLAW MARKING APPARATUS AND METHOD
Filed July 1, 1963
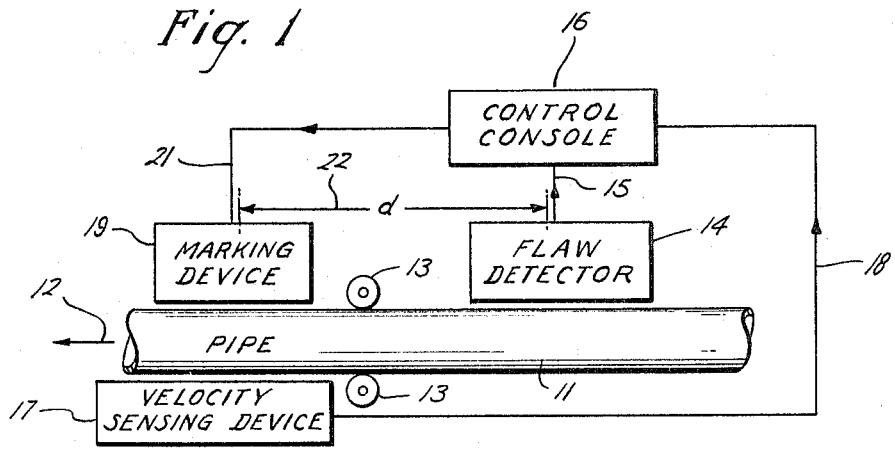
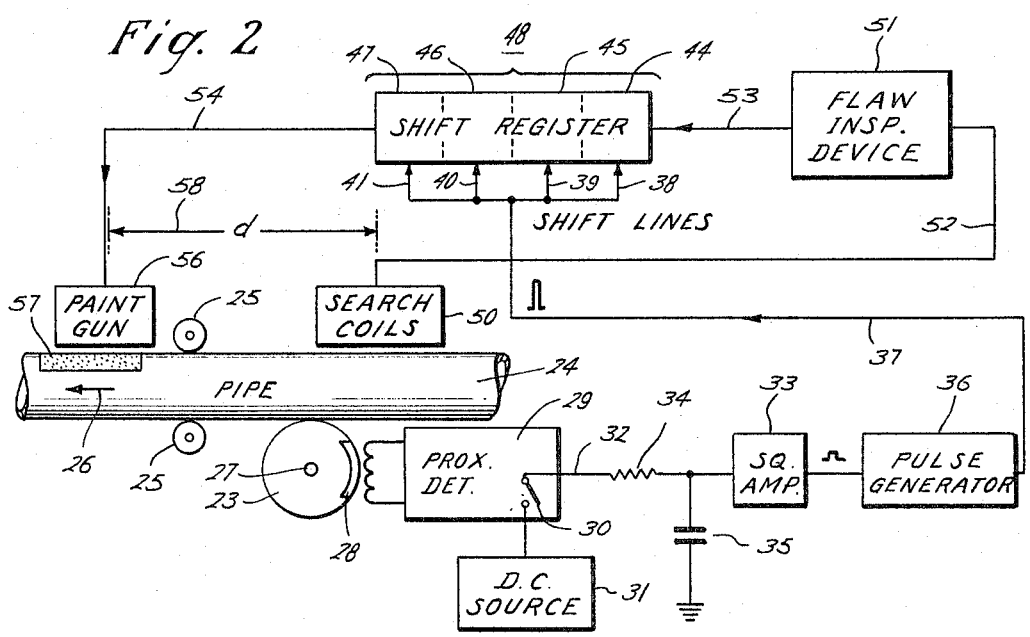
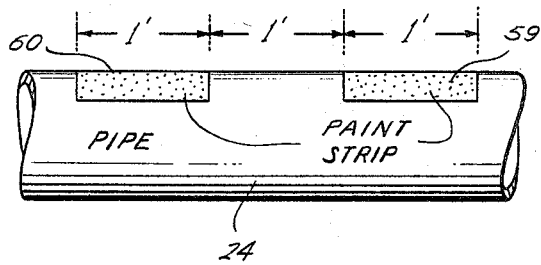
Fenton M. Wood
Alfred E. Crouch
INVENTORS
BY Arnold, Roylance & Harris
ATTORNEYS

United States Patent Office 3,290,167
Patented Dec. 6, 1966

3,290,167
MOTION RESPONSIVE FLAW MARKING
APPARATUS AND METHOD
Fenton M. Wood, Sugarland, and Alfred E. Crouch, Houston, Tex., assignors, by mesne assignments, to American Machine & Foundry Company, New York, N.Y., a corporation of New Jersey
Filed July 1, 1963, Ser. No. 291,636
6 Claims. (Cl. 117—37)

This invention relates to a motion responsive flaw marking apparatus for placing discernible markings on an elongate member being inspected. More particularly, the invention relates to an apparatus and method for detecting flaws in an elongate member, such as a pipe, and placing discernible marking on said member at the position of said flaws. The invention has particular application where the marking step is to be performed subsequent to the detection step and at a position spaced axially apart from the detection position.

Most prior art detecting and marking apparatuses have not been fully satisfactory for a number of reasons. One reason is that certain prior art apparatuses utilize a time delay relay between the detection and the marking. The shortcoming of this method is that if subsequent flaws should occur during the delay period, there will be a "dead zone" wherein no flaws will be marked.

Other prior art apparatuses mark at the same instant of detection and at the same spot. This is a very awkward system, particularly where a spraying operation or a magnetizing step is utilized to effect the marking.

Briefly stated, the present invention provides an apparatus and method for detecting flaws in an elongate member, such as a pipe being manufactured by electrical resistance welding. Means are provided for effecting relative movement between the member being inspected and a flaw detection means positioned closely adjacent thereto. Electrical flaw signals are produced as a result of flaws detected by the flaw detection means during the relative movement.

The flaw signals in the form of electrical signals are transferred to a first electrical storage position by means of a flaw signal circuit connected therebetween. The flaw signal storage position is in a flaw signal storage means such as a shift register having a series or sequence of electrical pulse storage elements. Electrical transfer signals are then produced by means of velocity sensing means supported adjacent to the member being tested. The velocity sensing means, perhaps in the form of a contacting and rotatable wheel, produces electrical transfer signals as a result of the relative axial movement of the member being inspected past the inspection means.

There is then provided another electrical circuit for applying the transfer signals to the various pulse storage elements in the shift register so that flaw signals are thereby sequentially transferred from the first pulse storage element, then to the second element, etc., to the last element, at which point it is released and applied to operate a marking device.

The marking apparatus is electronically operated by the released flaw signal. The marking apparatus is axially spaced apart from the detecting means so that the marking step is thus performed subsequent to the detection step and at a position axially spaced apart from the position where the detection of the flaw is made. There thus is provided a mark on the pipe which indicates the location of the defect. It is to be understood that any number of types of marking devices can be utilized such as a paint spray gun, a magnetizing means which places a magnetic mark on the pipe or the like. The mark on the pipe may then be utilized to denote pipe with certain types of defects. It may also be used to facilitate the cutting operation in pipe manufacture so that lengths of pipe may be cut from a continuously formed pipe and at the same time reducing the discarded portion to a minimum.

It is therefore an object of this invention to provide an apparatus and method for inspecting elongate members and subsequently marking the location of defects thereon, which marking is performed subsequent to the detection of the flaws and at a position axially spaced apart from the inspection operation.

It is another object of this invention to provide an apparatus and method as above characterized wherein the detection of flaws is a continuous operation in that there are no "dead zones" during the detection and marking operation.

It is a further objective of this invention to provide an apparatus and method for continuously testing an elongate member for defects and to place markings of said defects on the elongate member, which marking is performed subsequent to the detection and at a position axially spaced apart from the detection means by the operation of an electrical pulse storage means, which storage means allows for variations in the relative movement of the elongate member past the inspection means.

These and other objectives will become apparent with the description of the invention and by references to the drawings wherein the same references refer to like elements and in which:

FIG. 1 is a block diagram schematically showing the arrangement of certain components of the apparatus of this invention.

FIG. 2 is a block diagram schematically showing in greater detail the arrangement of certain components of the apparatus of this invention and certain of the electrical circuits.

FIG. 3 is a side elevation of a portion of an elongate member such as a pipe or rod which has been inspected by the apparatus and method of this invention and has been provided with paint marks indicating the location of defects.

Referring to FIG. 1, there is generally shown pipe 11 being supported and axially moved in the direction of arrow 12 by drive wheels 13, 13, which in this instance are the means for providing relative axial movement of pipe 11 past flaw detector 14.

Flaw detector 14 may take any number of forms depending on the type of material being inspected and the defects for which the searching is conducted. As an example, the flaw detection means could be a magnetic inspection device of conventional design utilizing search coils to detect variations in magnetic flux as indications of defects. It could also be some type of sonic inspection device or radio isotope device which will produce electrical impulses in response to the variations in the material or elongate member being inspected.

In any event, flaw detector 14 is arranged to transmit an electrical flaw signal to control console 16 via lead 15 and the operation thereof will be explained hereafter.

A velocity sensing device 17 is positioned adjacent to pipe 11 for detecting the relative velocity of pipe 11 past flaw detector 14. Velocity sensing device 17 may be a rotatable friction wheel used to operate a proximity detector, as will be explained, or any other velocity sensing device which will transmit electrical output signals to console 16 via lead 18 in response to the relative velocity of pipe 11 past flaw detector 14.

Control console 16 is arranged to receive flaw signals from detector 14, to store the flaw signals to progressively move the flaw signals through a sequence of storage positions by the operation of velocity sensing device 17 and to provide an output signal to marking device 19 via lead 21. Marking device 19 will then be energized by the signal released from control console 15, which will have delayed or stored a flaw signal for such period of time as is required for pipe 11 to move distance $d$ on arrow 22 relative to flaw detector 14.

A more detailed embodiment of the apparatus of this invention is shown in FIG. 2. The velocity sensing means in this instance is a circular member in the form of rotatable wheel 23 which is positioned such that its peripheral surface frictionally engages pipe 24 and is rotated as a result of the relative axial movement of pipe 24. The relative axial movement of pipe 24 is again provided by relative motion means in the form of a pair of supporting and driving wheels 25, 25, which frictionally engage pipe 24 and propel it in the direction of arrow 26. It is to be understood that other means of effecting relative axial movement of pipe 24 may be used and still fall within the scope of this invention.

Wheel 23 is rotated on shaft 27 by the axial movement of pipe 24. Wheel 23 is provided with metal slug 28 on one side and near the peripheral surface. As wheel 23 rotates, slug 28 rotates therewith and actuates proximity detector 29 with each rotation of wheel 23. The actuation of proximity detector 29 closes switch 30. A power source in the form of D.C. power source 31 is thereby applied to lead 32 which is connected to squaring amplifier 33 through resistor 34 and capacitor 35.

Squaring amplifier 33 provides a sharp voltage to pulse generator 36 (such as a blocking oscillator) which then transmits transfer signals or shift pulses over lead 37 to shift lines 38, 39, 40 and 41, which are connected individually to a plurality of electrical pulse storage elements connected in sequence. These pulse storage elements conveniently take the form of a shift register 48 having a plurality of connected together electrical pulse storage elements 44, 45, 46 and 47. One form of shift register which may be used in this invention is shown in a book by Millman and Taub, entitled Pulse and Digital Circuits, McGraw-Hill Book Co. Inc., New York, 1956, p. 426, FIGS. 13–43, the operation of which will be explained hereafter.

The flaw detecting means of this invention may take one of several forms as described above, but one convenient form, when inspecting magnetizable members is shown in FIG. 2. Electromagnetic responsive means in the form of search coils 50 are positioned closely adjacent pipe 24 so that axial movement of pipe 24 will effect relative axial movement therepast. Search coils 50 are connected to flaw inspection devices 51 by lead 52. Search coils 50 and flaw inspection device 51 may be any one of a number of magnetic inspection devices such as that shown in Nondestructive Testing Handbook, edited by Robert C. McMaster, The Ronald Press Co., New York, N.Y., volume II, p. 40. 7, FIG. 4.

In any event, the flaw detection device selected must be one which will produce an electrical signal as a result of the detection of a flaw. Flaw inspection device 51 is connected by lead 53 to element 44, which is the first in sequence of a plurality of electrical pulse storage elements. The last in sequence of the plurality of electrical pulse storage elements, i.e., element 47, is connected by lead 54 to a marking device in the form of paint gun 56, which when energized, applies a paint mark 57 to pipe 24.

In operation, let it be assumed that pipe 24 is moved in the direction of arrow 26 by wheels 25, 25 so that search coils 50 scan pipe 24. Whenever a flaw is detected by search coils 50, an electrical signal is transmitted to flaw inspection device 51, which then transmits an electrical flaw signal to storage element 44 of shift registed 48, where the flaw signal is temporarily stored.

The movement of pipe 24 also causes the rotation of wheel 23, which energizes pulse generator 36, which provides a shift pulse or transfer signals to elements 44, 45, 46, and 47 by shift lines 38, 39, 40 and 41. At each application of a shift pulse the stored data or flaw signal is advanced one stage. Hence, with the first shift pulse created by the first rotation of wheel 23, the stored flaw signal is advanced to the next pulse storage element, i.e. element 45, and so forth until the flaw signal has reached the last in sequence of the plurality of pulse storage elements, i.e. element 47. Then the next shift pulse will release or transfer the flaw signal from element 47 and it will be applied to paint gun 46 by lead 54. Paint gun 56 will then be energized to provide paint marking 57 on pipe 24.

It will be observed that the number of pulse storage elements provided in shift register 48 and the size of wheel 23 will be so selected that the time required for pipe 24 to travel distance $d$ indicated on arrow 58 will equal the time required for a flaw signal detected by search coils 50 to be sequentialy transferred through shift register 48 and to energize paint gun 56.

Reference to FIG. 3 will show how two flaws might be marked on pipe 24 by paint marks 59 and 60. Paint gun 56 sprays a stripe of paint of a predetermined length on pipe 24, so that a defect is readily discernible. If a second defect is detected, the resulting flaw signal will likewise be sequentially transferred through shift register 48 to paint gun 56, so that there will be a continuous paint stripe if there are continuous flaws. However, the flaws may be spaced apart as indicated by paint marks 59 and 60.

By reference to these discernible marks, the pipe can be conveniently graded. Alternatively, if the pipe is being manufactured in a continuous process, then the cut-off mechanism can be effectively operated by reference to the paint marks, so that the number of flaw-free lengths may be maximized and the amount of pipe discarded may be minimized.

It is apparent that the invention herein provides the art with a relatively simple detection and marking apparatus for placing discernible markings on a member being inspected as indications of the location of flaws. This invention is particularly useful where that marking must be subsequent to the detection and carried out in a position spaced axially apart from the flaw detection means.

It will be observed that the apparatus of this invention overcomes many of the shortcomings of the prior art, namely, that it is continuous and that there are no "dead zones" in the detection system which is really a continuous detection and marking apparatus and method.

Another important advantage of this invention is that it provides an apparatus and method for subsequently placing a marking on an elongate member being inspected, and at the same time allows for variations in the relative speed of the elongate member past the inspection means. Hence, if there should be a considerable variation in the velocity of the movement of the elongate member past the detection means, this variation is compensated for by the operation of the apparatus of this invention, such that the marking is always placed on the elongated member at the location of the defect.

Further modifications may be made in the invention as particularly described without departing from the scope of the invention. Accordingly, the foregoing description is to be construed illustratively only and is not to be construed as a limitation upon the invention as defined in the following claims.

What is claimed is:
1. The method of detecting flaws in an elongate member and placing discernible markings on said member at the position of said flaws comprising the setps of:
    effecting relative axial movement of said elongate member with a flaw detecting means positioned adjacent thereto,
    producing electrical flaw signals in response to said flaws detected during said movement, storing said flaw signals in a first electrical pulse storage position in an electrical pulse storage means,
producing electrical transfer signals as an incident of the relative velocity of said relative movement,
applying said transfer signals to said electrical pulse storage means and thereby transferring said stored flaw signals to a second electrical pulse storage position, and
subsequently applying said stored flaw signals to effect markings on said elongate member at a position spaced axially apart from said flaw detecting means which markings indicate the location of defects in said member.

2. A motion responsive flaw marking apparatus for placing discernible markings on an elongate member as indications of the location of flaws in said member where the marking is performed subsequent to the detection of said flaws and at a marking position spaced axially apart from said detection position comprising:
a velocity sensing means supported adjacent to said elongate member and adapted to product electrical transfer signals as an incident of relative axial movement of said elongate member with respect to a flaw detection means,
means for effecting said relative movement,
a first electrical circuit connecting said velocity sensing means and a plurality of electrical pulse storage elements connected together in sequence and applying said transfer signals to said storage elements,
said flaw detection means positioned adjacent said elongate member for scanning said elongate member during said relative movement and producing electrical flaw signals as an incident of flaws detected in said member,
a second electrical circuit connecting said detection means and the first in sequence of said pulse storage elements and transmitting said flaw signals to said first storage element,
an electrically operated marking apparatus positioned adjacent said elongate member and spaced axially apart from said detection means and connected to the last in sequence of said pulse storage elements and energized by output signals transferred from said last storage element,
whereby flaws in said elongate member are detected in the form of flaw signals which are sequentially transferred through said storage elements by operation of said velocity sensing means an applied to said marking apparatus to place markings on said elongate member as indications of the location of flaws.

3. The apparatus as claimed in claim 2 wherein:
said velocity sensing means includes a circular member supported in frictional engagement with said elongate member and is adapted to be rotated as an incident of relative axial movement of said elongate member.

4. The apparatus as claimed in claim 2 wherein:
said plurality of electrical pulse storage elements is a shift register having at least two electrical pulse storage elements.

5. The apparatus as claimed in claim 2 wherein:
said flaw detection means includes an electromagnetic responsive means which detects variations in a magnetic field in said elongate member as indications of flaws in said member.

6. A motion responsive flaw marking apparatus for placing discernible markings on an elongate member as indications of the location of defects in said member where the marking is performed subsequent to the detection of said defects and at a marking position spaced axially apart from said detection position comprising:
a circular member supported in frictional engagement with said elongate member and adapted to be rotated as an incident of relative axial movement of said elongate member,
means for effecting said relative movement,
a first electrical circuit energized to produce electrical transfer signals as an incident of said rotation and connected to a shift register having at least two electrical pulse storage elements connected in sequence,
an electromagnetic responsive flaw detection means positioned adjacent to said elongate member for detecting variations in a magnetic field in said elongate member during said relative axial movement and producing electrical flaw signals as an incident of said variations,
a second electrical circuit connecting said electromagnetic responsive means and the first in sequence of said elements for transmitting said flaw signals to said first elements,
an electrically operated marking apparatus positioned adjacent said elongate member and spaced axially apart from said electromagnetic responsive means and connected to the last in sequence of said elements and energized by output signals transferred from said last element.
whereby flaws in said elongate member cause variations in said magnetic field which induce voltages in said magnetic responsive means which signals are initially stored in said first element and subsequently transferred to and from said last in sequence of elements by the operation of said circular member and applied to said marking apparatus to place markings on said elongate member as indications of the locations of said flaws.

References Cited by the Examiner

UNITED STATES PATENTS

| | | | |
|---|---|---|---|
| 2,135,050 | 11/1938 | Perry | 324—37 |
| 2,342,474 | 2/1944 | Klein et al. | 118—9 X |
| 2,432,811 | 12/1947 | Sams | 324—37 |
| 2,896,196 | 7/1959 | Hartford et al. | 340—259 |
| 2,952,807 | 9/1960 | Heller | 73—518 X |
| 3,039,428 | 6/1962 | McLean | 118—11 X |
| 3,190,261 | 6/1965 | Ziffer | 118—8 |

FOREIGN PATENTS 736,464   9/1955   Great Britain.

ALFRED L. LEAVITT, *Primary Examiner.*

A. GOLIAN, *Assistant Examiner.*